United States Patent [19]
Read et al.

[11] Patent Number: 5,223,996
[45] Date of Patent: Jun. 29, 1993

[54] COMBINED SHOCK MOUNT FRAME AND SEAL FOR A RIGID DISK DRIVE

[75] Inventors: John D. Read, Monument, Colo.; Charles E. Vaillant, Hudson, Mass.

[73] Assignee: Digital Equipment Corporation, Maynard, Mass.

[21] Appl. No.: 855,991

[22] Filed: Mar. 20, 1992

[51] Int. Cl.⁵ .................................. G11B 17/02
[52] U.S. Cl. ................................... 360/97.02
[58] Field of Search ................. 360/97.01–97.04, 360/137; 369/75.1; 248/615, 632, 636, 638

[56] References Cited

U.S. PATENT DOCUMENTS

| | | | |
|---|---|---|---|
| 3,863,881 | 2/1975 | Fletcher et al. | 248/358 R |
| 4,034,411 | 7/1977 | Kraemer et al. | 360/98.07 |
| 4,367,503 | 1/1983 | Treseder | 360/97.03 |
| 4,491,888 | 1/1985 | Brown et al. | 360/99.08 |
| 4,553,183 | 11/1985 | Brown et al. | 360/97.02 |
| 4,825,316 | 4/1989 | Kishi et al. | 360/97.02 |
| 4,937,806 | 6/1990 | Babson et al. | 369/75.1 |
| 4,974,104 | 11/1990 | Ferguson et al. | 360/97.04 |
| 4,979,062 | 12/1990 | Stefansky et al. | 360/97.02 |
| 5,004,207 | 4/1991 | Ishikawa et al. | 360/97.02 |
| 5,021,905 | 6/1991 | Sleger | 360/97.02 |
| 5,079,655 | 1/1992 | Yagi | 360/97.02 |
| 5,081,551 | 1/1992 | Aruga | 360/97.01 |

Primary Examiner—Rubert S. Tupper
Attorney, Agent, or Firm—Barry N. Young; Dirk Brinkman

[57] ABSTRACT

A combined shock mount frame and seal for a rigid or hard disk drive is constructed by attaching a compressible seal to the edge of a rectangular rigid plastic frame. The seal is provided with a circumferential angular groove on an interior portion having a depth slightly greater than half the thickness of the mounting base of the head and disk assembly of the drive. A circumferential angular ridge is formed on an exterior portion of the seal to conform to the mating edge of the covers of the drive enclosure. The frame is externally dimensioned to fit inside the covers of the drive enclosure. In use, a frame is placed inside a top and bottom cover of the drive enclosure. The mounting base is compressively held in the grooves of the seals of each of the two frames to provide shock resistance to the head and disk assembly and the ridge is compressively held between the mating edges of the covers to hermetically the drive enclosure.

16 Claims, 3 Drawing Sheets

COMBINED SHOCK MOUNT FRAME AND SEAL FOR A RIGID DISK DRIVE

FIELD OF THE INVENTION

This invention relates to head and disk assemblies utilized in disk storage devices, and more particular to head and disk assemblies which are shock mounted and environmentally sealed.

BACKGROUND OF THE INVENTION

With the increased use and popularity of laptop and notebook-sized computers it seems to be a common thread that the fragility of the disk drive in portable systems is a major cause of product failure and customer dissatisfaction. Portable computers are generally handled much like calculators, frequently carried from place to place, bounced about, and prone to be being accidentally dropped. The likelihood of fatal damage to the disk storage device is increased if the drive is made removable from the computer to provide for the portability of the information for data interchange, security, and archiving.

In disk drives, the head and disk assembly ("HDA") include not only the most sensitive components, but also the components which are the most expensive. Cost savings accrue more with cost avoidance from not having to replace broken products or loss of future sales to dissatisfied customers.

A typical rigid or hard disk HDA comprises one or more rotatably mounted disks having an extremely thin magnetic coating deposited on the highly polished disk substrate. Information is generally written and read from the magnetic recording surface by a fragile thin film read/write head. The head is usually delicately suspended at the end of a thin flexure which is in turn attached to a cantilevered beam which is radially positionable above the various concentric data recording tracks of the disks.

During operation of the disk drive, the disks rotate at high speed and the heads fly above the recording surfaces on a thin air foil created by the rotation of the disks. Any imperfections in the outer coating of the disks or contaminants present in the environment are likely to interfere with flight of the heads, reducing the performance of the drive.

Major imperfections in the surface topology of the disk or loose particles will cause the heads to crash into the disk surface, making the device unfit for its intended purpose. Also, since the heads fly at an extremely low altitude any unexpected physical movement of the drive may cause the heads to strike the disks, resulting in damage to either the heads, the surface of the disks, or both.

When the disk drive is turned off, the heads are generally "parked" in a rest state on the disk surface. When the heads are parked, the most sensitive direction is perpendicular to the disk surface. If the acceleration applied to the heads exceeds a certain level, decided by the head load and the mass of the head, the head will leap off the disk surface on which it is parked and then slap down marring the surface, and possibly damaging the head and the head suspension components. In the transverse direction the heads are generally more resistant to shock.

Conventional head and disk assemblies are typically shock mounted into an external support frame. However, disk drives having a small form factor, 2½" and below, do not have such an external frame. Any shock absorbing features are left to the integrator of the drive into the computer system, or to the inherent shock resistance of the components. Commonly, manufacturers of conventional small form factor drives may claim 100 g resistance to shocks, without referencing either the duration or the direction of the shock with respect to the axis of the disk. However, should a drive or the equipment in which it is mounted be dropped from a height of about three feet the de-accelerating force can approach 1000 g.

Therefore, in order to improve the durability of small form factor drives, it is desirable to provide a shock mount frame which decreases their mechanical vulnerability of the HDA components. In addition, the durability of the drive can be improved by hermetically sealing the drive enclosure.

SUMMARY OF THE INVENTION

In accordance with the present invention, there is provided an elastomeric rigidified shock absorber for soft mounting a head and disk assembly ("HDA") in an enclosure of a rigid or hard disk storage drive. More particularly, the invention involves the utilization of a shock mount frame which is easy to manufacture, convenient to install, and substantially improves the resistance of the HDA to physical damage as the drive is repeatedly shaken and jarred. In addition, the shock mount frame, as disclosed herein, substantially excludes water vapor, corrosive gases, and solid contaminants from the environment within the drive enclosure.

The shock mount frame is constructed by attaching a compressible seal to the edge of a rectangular rigid plastic frame-shaped carrier. The seal is provided with a circumferential angular groove on an interior portion having a depth slightly greater than half the thickness of the mounting base of the HDA. A circumferential angular ridge is formed on an exterior portion of the seal to conform to the mating edge of the covers of the enclosure. The carrier is externally dimensioned to fit inside each of two covers which when put in opposite relationship form the drive enclosure.

During assembly of the drive one frame is placed in each of the covers with the ridges of the frames protruding between the mating edges. The mounting base of the HDA is seated in the grooves of the seals of the frames and the covers are compressed together to conform the seal around the peripheral edges of the mounting base to shock mount the base and the hermetically seal the interior of the drive enclosure. The covers can then be permanently fixed in place by conventional attachment means, such as an adhesively backed sealing tape.

Thus, without increasing the exterior dimensions of the disk storage device, the HDA is soft mounted between the compressible seals of the shock mount frame, decreasing the likelihood of damage which may occur in response to unexpected movement. In addition, the shock mount frame minimizes the leakage of contaminants into the drive enclosure to further improve the reliability of the drive.

DESCRIPTION OF THE PREFERRED EMBODIMENT

Figure 1:
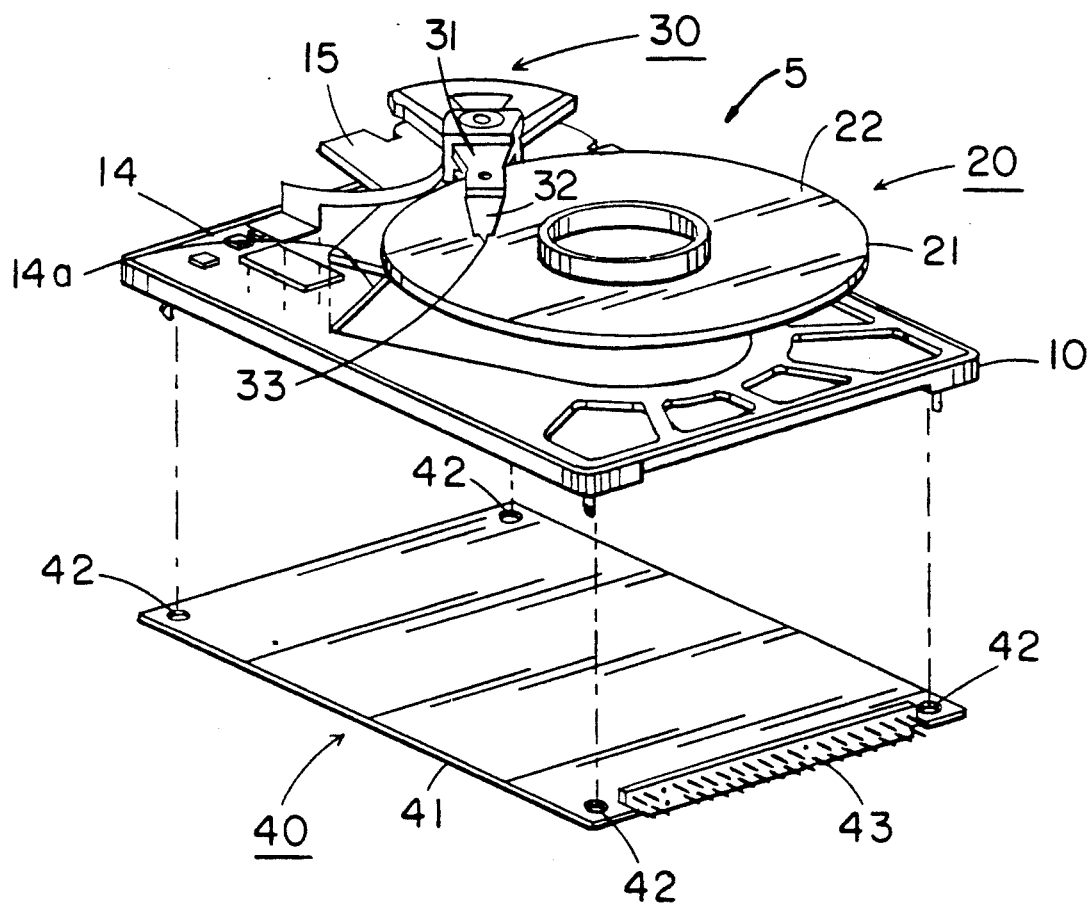
FIG. 1 is perspective view of a compact head and disk assembly and controller of a rigid or hard disk storage drive which can use the shock mount frame according to the present invention.

FIG. 1 shows a conventional head and disk assembly ("HDA") 5 and controller 40 typically used with compact rigid or hard disk drives. The HDA 5, as shown, is configured to compatible with 2½" form factor industry standard dimensions. A 2½" form factor drive has a length of 4.0" and a width of 2.75" and a disk diameter of about 2½" (65 mm). Disk drives of this size, and smaller, are frequently used with portable computer systems, generally known as laptops and notebook-sized computers, and therefore are particularly vulnerable to damage caused by unexpected physical movement.

The HDA 5 comprises a generally rectangular mounting base 10 formed of an exterior portion 14 having a hole 14a therein and an interior portion 15 shaped to fit the hole 14a. A disk assembly 20 and a head assembly 30 are mounted on the interior portion 15 of the base 11. The disk assembly 20 includes a rotatably mounted disk 21 having at least one recording surface 22 for storing information. The recording surface 22 is coated with a thin film of magnetic material, typically in the range of micron, which is extremely sensitive to solid and gaseous contaminants which must be excluded by the HDA enclosure.

The exterior portion 14 of the base 11 is made of, for example, weight reducing plastic molded to size. The interior portion 15 is made of, for example steel to provide rigid surface for the disk and head assemblies 20 and 30 mounted thereon. The exterior portion 14 is attached to the interior portion 15 by, for example, a semi-flexible adhesive such as "LOCK-TITE 366" made by the Loctite Corporation of Newington, Conn., to provide the HDA 5 with increased resistance to laterally induced shocks.

The head assembly 30 includes a movably mounted positioner arm 31 having a flexure 32 for suspending a read/write head 33 above the recording surface 22 of the disk 21. The read/write head 33 of modern high density disk drives are made, for example by using thin film techniques, to reduced the overall size of the head 33 allowing the data bits to be placed more closely together.

The controller 40 comprises a rectangularly shaped printed circuit board ("PCB") 41, approximately the same size as the base 10, having electronic components and circuits, not shown, mounted thereon. The PCB 41 is provided with, for example, four through-holes 42 for mounting the PCB 41 to the base 10. An electrical interface, for example an I/O connector 43 is mounted on one edge of the PCB 41 for electrically connecting the controller 40 and HDA 5 with a host computer.

During operation of the HDA 5 the disk 21 is rotated at high velocity, for example 3600 rpm or greater, and head 33 flies at a low altitude above the recording surface 22. Although the cantilevered arm 31 provides substantial rigidity for the head 33 in the lateral direction, any unexpected movement of the drive in a direction perpendicular to the head 33 is likely to cause the head 33 to touch down on the recording surface 22. When the HDA 5 is not being used, the head 33, is parked on the recording surface 22. Even in this attitude, excessive jarring of the HDA 5 may cause the head 33 to jump about on the surface 22, possibly damaging the head 33, the recording surface 22, or both.

The prior art has provided shock mounting techniques which minimize the likelihood of physical damage to the HDA 5. Such techniques generally include a mounting frame external to the HDA 5 enclosure which greatly increase the size of the unit and therefor makes it less suitable for applications having limited mounting space, for instance, laptop and notebook-sized computers. Moreover, such techniques are totally useless when the entire drive is made removable. For a portable disk drive it is important that the shock mounting mechanism be self-contained within the drive enclosure. In addition, prior art shock mounting techniques do not generally concern themselves with environmental sealing, therefore requiring separate sealing mechanisms at an incremental cost.

For these reasons, the inventors presently disclose, as an improvement over the prior art, a shock mount frame which reduces shock induced damage, while simultaneously improving the environmental quality of the HDA enclosure. All of this, and more, is achieved without increasing the overall dimensions of a compact form factor compatible rigid or hard disk drive.

Figure 2:
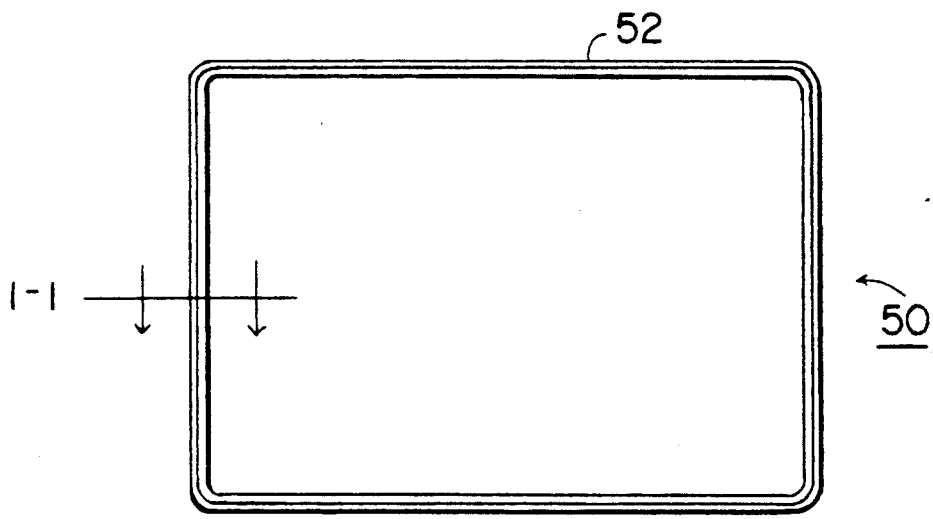
FIG. 2 is top planar view of the shock mount frame according to the present invention.
Figure 3:
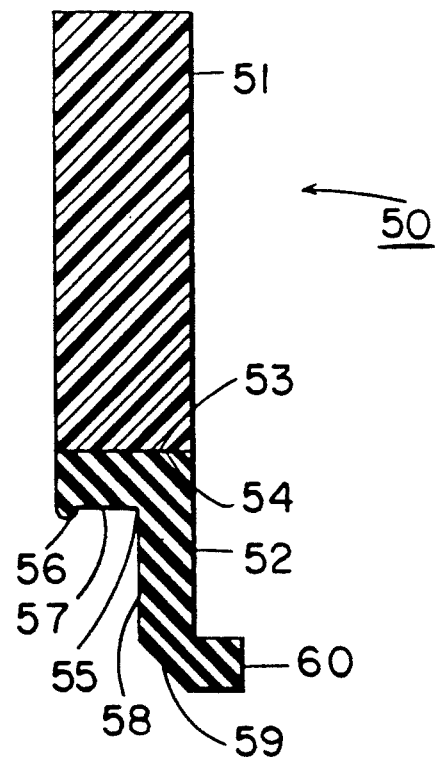
FIG. 3 is a cross-sectional view of the frame of FIG. 2 viewed in the direction of line 1—1.

Now with reference to FIGS. 2 and 3, the structure of the shock mount frame 50, according to the present invention, is described in further detail. The frame 50 comprises a rigid frame-shaped carrier 51 having a compressible seal 52 attached to one circumferential edge 53 thereof. The carrier 51 is generally shaped to conform to the shape the peripheral edges of the base 10 of a HDA 5, such as is depicted in FIG. 1. The carrier 51 is shaped, for example, rectangularly with an open interior and with an elongated rectangular cross-section. The carrier 51 is molded from a reinforced plastic, by of example 20% glass filled plyphenelleoxide. Alternatively, the carrier 51 can also be constructed from stamped aluminum, nylon, or other similar light weight rigid materials.

As shown in the cross-sectional view of FIG. 3, the seal 52 is irregularly shaped with a portion 54 having the same thickness as the edge 53 of the carrier 51. The seal 53 is further provided with an angular circumferential groove 55 shaped to fit around the peripheral edge of the base 10 of FIG. 1. A semi-circular circumferential rib 56 is formed on a first side portion 57 of the groove 55. A second side portion 58 of the groove 55 includes a beveled edge 59 having an angle of, for example, approximately thirty degrees. Extending in an outward direction from the seal there is a squared ridge 60. The length of the second side portion 58 of the groove 55, including the beveled edge 58 is made about equal to half the thickness of the mounting base 10 of the HDA 5 of FIG. 1.

The seal 52 is manufactured of a compressible, impervious material, for example silicon, rubber, or EPDM, fully cured. The edge 54 of the seal 52 is bonded to the edge 53 of the carrier 52 during the vulcanization of the seal 52 while still in the mold.

Figure 4:
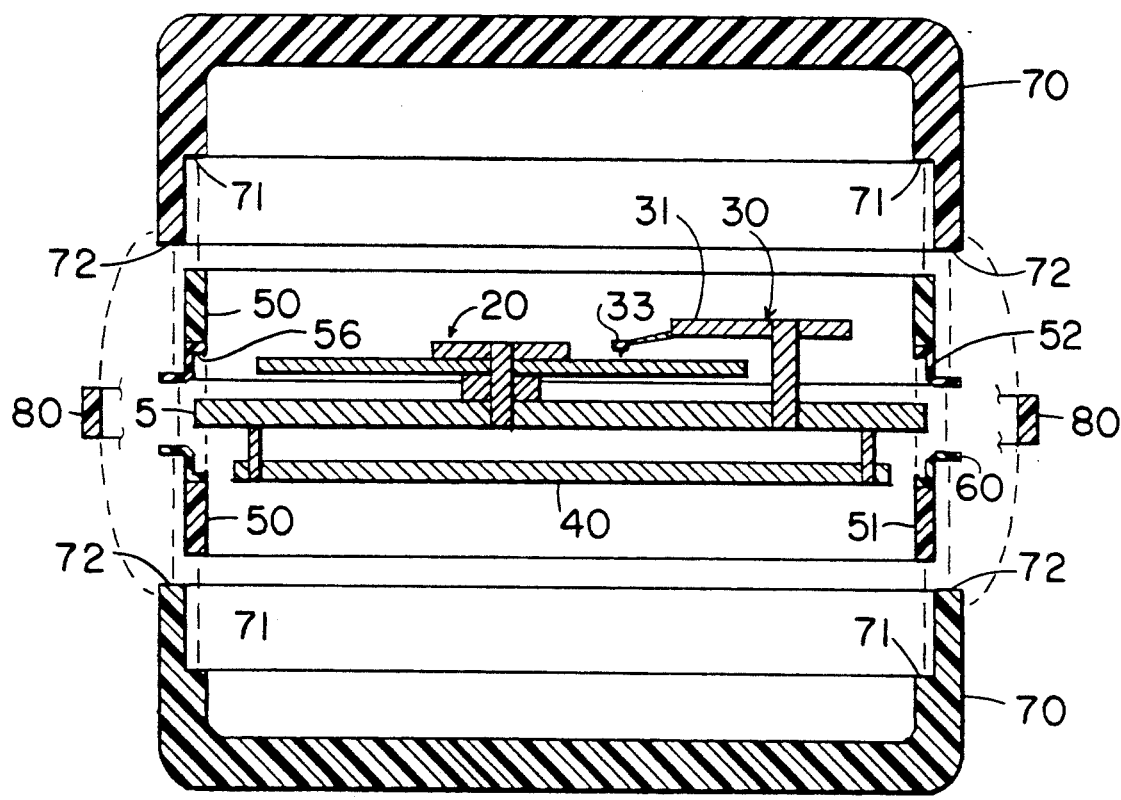
FIG. 4 is a exploded cross-sectional view of an arrangement of a rigid disk drive including the HDA and controller of FIG. 1 using the shock mount frame of FIGS. 2 and 3 according to the present invention.

FIGS. 4 shows an arrangement of a rigid or hard drive, prior to assembly, which can use the shock mount frame 50 according to the present invention. The arrangement includes two generally rectangularly shaped covers 70 having mating edges 72 for enclosing an HDA 5 and controller 40 of the type shown in FIG. 1. Each of the covers 70 includes, for example, an angular circumferential interior ledge 71 dimensioned for receiving the shock mount frame 50.

The arrangement as shown in FIG. 4 is typically assembled in a room having a relatively clean ambient environment, for example, a Class 100 "clean room" as set out in U.S. Federal Standards and Specification 209.

The general steps of the procedure necessary to assemble the arrangement 4 are now set forth. A frame 50 is placed onto the ledges 71 of each of the two covers 70. When the frames 50 are positioned in place in the covers 70, the ridges 60 protrudes over the mating edges 72. For this reason the width of the ridge 60 is substantially the same as the thickness of the mating edges 72 of the covers 70. The base 10 of the HDA 5 with the controller 40 attached is inserted into the grooves 55 of the seals 52. The beveled edges 59 ensure the alignment of the base 10 with the grooves 55 during insertion, and permit the use of automated assembly equipment without damaging the seal 52. The covers 70 are compressed together deforming the ribs 55 and the ridges 60 to form a sealed enclosure for the HDA 5 and controller 40. The covers 70 can be permanently attached to each other by conventional attachment means, such as an adhesively backed tape 80.

The shock mount frame as described is described in the context of, for example, a single rigid or hard disk with a magnetic coating for recording information and utilizing Winchester technology. However, the disk drive using the frame may, in alternative embodiments, utilize a plurality of disks, with a corresponding number of read/write heads, generally two heads per disk, one for each disk surface. Other types of disks, for example, optical disks, and other read/write technologies, for example, laser, may also be used by the present invention.

While there has been shown and described a preferred embodiment, it is to be understood that various other adaptations and modifications may be made within the spirit and scope of the invention.

What is claimed is:

1. A combined shock mount frame and seal, for use with a head and disk assembly ("HDA") of a rigid or hard drive, the HDA including a mounting base, and the HDA being enclosed within oppositely facing covers having mating edges, comprising:
   a substantially rigid frame-shaped carrier having an opening therein and having a circumferential edge dimensioned substantially the same as the peripheral edge of the mounting base of the HDA; and
   an elastomeric seal formed on said circumferential carrier edge, said seal including an inwardly facing circumferential groove configured to receive the peripheral edge of the mounting base of the HDA.

2. The frame as in claim 1 wherein said circumferential groove is angular having a first and second side portion.

3. The frame as in claim 2 wherein said first side portion further includes a semi-circular compressible circumferential rib.

4. The frame as in claim 2 wherein said second side portion being partially beveled and having a length slightly larger than half the thickness of the mounting base.

5. The frame as in claim 1 further including a circumferential compressible ridge formed on the exterior portion of said seal, said ridge having a width about the same as the thickness of the mating edges of the covers.

6. The frame as in claim 1 wherein said carrier is made of reenforced plastic and said seal is made of silicon, rubber or EPDM.

7. A method for shock mounting and sealing a head and disk assembly ("HDA") mounted on a mounting base of a rigid disk drive, comprising:
   placing a frame in a ledge formed on the inside wall of each of two oppositely facing covers for enclosing a HDA of the disk drive, said frame including a substantially rigid carrier having an central opening therein and a circumferential carrier edge and a elastomeric seal formed on said circumferential carrier edge, said seal including an inwardly facing circumferential angular groove for receiving the mounting base of the HDA;
   inserting the mounting base in said grooves of said frames placed in said oppositely facing covers;
   compressing said covers together to hold said mounting base in said grooves of said seals; and
   sealing the mating edges of said covers; and
   fixing said covers to each other.

8. An arrangement for shock mounting and sealing a head and disk assembly ("HDA") of a rigid or hard drive comprising:
   a mounting base having a first and second side surface, said first and second side surface having first and second peripheral edges respectively, said HDA being mounted on said first side surface;
   a first and second cover having first and second mating edges for enclosing said HDA and said mounting base; and
   a first and second frame fitted inside said first and second covers respectively, said first and second frames including:
   a first and second substantially rigid frame-shaped carrier having an opening therein, said first and second carrier having a first and second circumferential edge dimensioned substantially the same as said respective first and second peripheral edges of said mounting base, and
   a first and second elastomeric seal formed on said first and second circumferential edge of said first and second carriers, said first and second seals including an inwardly facing circumferential groove configured to receive said first and second peripheral edges of said mounting base.

9. The arrangement as in claim 8 wherein said circumferential grooves each has an angular profile having a first and second side portion.

10. The arrangement as in claim 9 wherein said first side portion further includes a semi-circular elastomeric circumferential rib.

11. The arrangement as in claim 9 wherein said second side portion being partially beveled and having a length slightly larger than half the thickness of said mounting base.

12. The arrangement as in claim 8 further including a circumferential elastomeric ridge formed on the exterior portion of said seal, said ridge having a width about the same as the thickness of the mating edges of said covers.

13. The arrangement as in claim 8 wherein said mounting base further includes an exterior portion having a hole therein, and an interior portion shaped to fit in said hole, said HDA being mounted on said interior portion, and said exterior portion being attached to said interior portion by a semi-flexible adhesive.

14. The arrangement as in claim 13 wherein said exterior portion is made of plastic and said interior portion is made of steel.

15. The arrangement as in claim 8 wherein each of said covers further includes a circumferential interior ledge shaped to receive said carriers.

16. The arrangement as in claim 8 further including a controller mounted on said second side surface of said mounting base.

* * * * *